United States Patent
Mills et al.

(10) Patent No.: US 9,771,821 B1
(45) Date of Patent: Sep. 26, 2017

(54) TURBINE INTERSTAGE SEAL WITH SELF-BALANCING CAPABILITY

(71) Applicants: Jacob A Mills, Jupiter, FL (US); Russell B Jones, North Palm Beach, FL (US); Thomas D Sexton, Tequesta, FL (US)

(72) Inventors: Jacob A Mills, Jupiter, FL (US); Russell B Jones, North Palm Beach, FL (US); Thomas D Sexton, Tequesta, FL (US)

(73) Assignee: FLORIDA TURBINE TECHNOLOGIES, INC., Jupiter, FL (US)

( * ) Notice: Subject to any disclaimer, the term of this patent is extended or adjusted under 35 U.S.C. 154(b) by 274 days.

(21) Appl. No.: 14/739,536

(22) Filed: Jun. 15, 2015

(51) Int. Cl.
*F01D 11/02* (2006.01)
*F01D 1/02* (2006.01)

(52) U.S. Cl.
CPC .............. *F01D 11/025* (2013.01); *F01D 1/02* (2013.01)

(58) Field of Classification Search
CPC ...... F16J 15/3444; F16J 15/43; F16J 15/4472; F16C 33/7836; F16C 33/765; F16C 37/005; F01D 11/16; F01D 11/02; F01D 11/025; F01D 11/001
USPC .............. 277/378, 410–412, 415; 415/173.3, 415/173.5, 173.7, 230, 231
See application file for complete search history.

(56) References Cited

U.S. PATENT DOCUMENTS

| 4,447,063 | A | * | 5/1984 | Kotzur | F16J 15/342 277/304 |
| 5,137,286 | A | * | 8/1992 | Whitford | F16J 15/441 277/410 |
| 5,161,804 | A | * | 11/1992 | Orlowski | F16J 15/3444 277/378 |
| 6,220,602 | B1 | * | 4/2001 | Webster | F16J 15/3288 277/378 |
| 7,249,769 | B2 | * | 7/2007 | Webster | F01D 11/025 277/410 |
| 8,038,155 | B2 | * | 10/2011 | Zheng | F16J 15/3444 277/302 |
| 8,186,945 | B2 | * | 5/2012 | Bhatnagar | F01D 11/22 415/173.1 |
| 8,201,830 | B2 | * | 6/2012 | Nobrega | F16J 15/3444 277/345 |
| 8,696,331 | B2 | * | 4/2014 | Cunningham | F04D 13/10 310/86 |
| 2002/0060432 | A1 | * | 5/2002 | Webster | F01D 11/025 277/411 |
| 2017/0051834 | A1 | * | 2/2017 | Webster | F16J 15/3288 |

\* cited by examiner

*Primary Examiner* — Matthew W Jellett
(74) *Attorney, Agent, or Firm* — John Ryznic

(57) ABSTRACT

An interstage seal for a turbine of a gas turbine engine, the interstage seal having a seal carrier with an axial extending seal tooth movable with a stator of the engine, and a rotor with a seal surface that forms the interstage seal with the seal tooth, where a magnetic force produced by two magnets and a gas force produced by a gas pressure acting on the seal carrier forms a balancing force to maintain a close clearance of the seal without the seal tooth contacting the rotor seal surfaces during engine operation. In other embodiments, two pairs of magnets produce first and second magnetic forces that balance the seal in the engine.

15 Claims, 5 Drawing Sheets

TURBINE INTERSTAGE SEAL WITH SELF-BALANCING CAPABILITY

GOVERNMENT LICENSE RIGHTS

This invention was made with Government support under contract number DE-SC0008218 awarded by the Department of Energy. The government has certain rights to this invention.

CROSS-REFERENCE TO RELATED APPLICATIONS

None.

BACKGROUND OF THE INVENTION

Field of the Invention

The present invention relates generally to a gas turbine engine, and more specifically to a turbine interstage seal with balancing capability.

Description of the Related Art Including Information Disclosed Under 37 CFR 1.97 and 1.98

In a gas turbine engine, such as a large frame heavy-duty industrial gas turbine (IGT) engine, a hot gas stream generated in a combustor is passed through a turbine to produce mechanical work. The turbine includes one or more rows or stages of stator vanes and rotor blades that react with the hot gas stream in a progressively decreasing temperature. The efficiency of the turbine—and therefore the engine—can be increased by passing a higher temperature gas stream into the turbine. However, the turbine inlet temperature is limited to the material properties of the turbine, especially the first stage vanes and blades, and an amount of cooling capability for these first stage airfoils.

In the turbine section, an interstage seal is used to provide for a seal between a rotating part and a static part of the turbine. A labyrinth seal is typically used between a rotor disk with rotor blades and a stator vane to prevent hot gas from the mainstream gas flow from entering a rim cavity where the high temperature gas can be exposed to the rotor disk. A labyrinth seal typically has a number of teeth that rotate about a static surface and can even rub against the surface during operation. Because a turbine in a gas turbine engine is exposed to a wide variation in temperatures, the spacing between the labyrinth teeth and the static surface can vary. During an engine transient—such as engine startup or shut down—the labyrinth seal gap can vary widely and thus create a large leakage path.

BRIEF SUMMARY OF THE INVENTION

An interstage seal for a turbine of a gas turbine engine, where the interstage seal includes a seal carrier with an axial extending seal tooth axial movable within the stator, and a rotor with a rotor seal surface opposed to the seal tooth that forms the interstage seal. A pair of magnets secured on the rotor and the stator pushes the seal tooth away from the rotor seal surface while a gas pressure pushes the seal tooth toward the rotor seal surface. Thus, a magnetic force is produced that opposes a gas pressure force that the interstage seal maintains a close clearance to the rotor without the seal tooth contacting the rotor seal surface during engine operation.

In a second embodiment, the gas force is replaced with a second pair of magnets that together form a first magnetic force and a second magnetic force that balances the seal tooth with the rotor seal surface to maintain the close clearance.

In a third embodiment, two pairs of magnets produce first and second magnetic forces that balance a seal carrier having a forward seal tooth and an aft seal tooth that forms forward and aft seals between a first rotor and a second rotor.

DETAILED DESCRIPTION OF THE INVENTION

The present invention is an interstage seal in a turbine of a gas turbine engine where the seal is self-balancing such that a seal carrier follows movement of a rotor as the rotor shifts axially during operation. The high performance rotating-to-static balancing seal can be made with two fundamental principles: a floating seal carrier and a balance of forces.

In the floating seal carrier, a rotationally static seal is mounted to a static housing while maintaining freedom to move in an axial direction. Axial freedom allows the seal to track the rotor position so clearance is insensitive to axial deflections. The primary sealing surfaces are vertical so the clearance is insensitive to radial deflections. Secondary static-to-static seals, between the seal carrier and the housing, provide a good means of sealing.

In the balance of forces, a force is created so the seal maintains a close clearance to the rotor without contacting it. Force balance can be achieved by pressure forces, hydrostatic force, magnetic forces, mechanical forces, or a combination of these forces. Closing and opening forces balance each other at the desired operating clearance.

Figure 1:
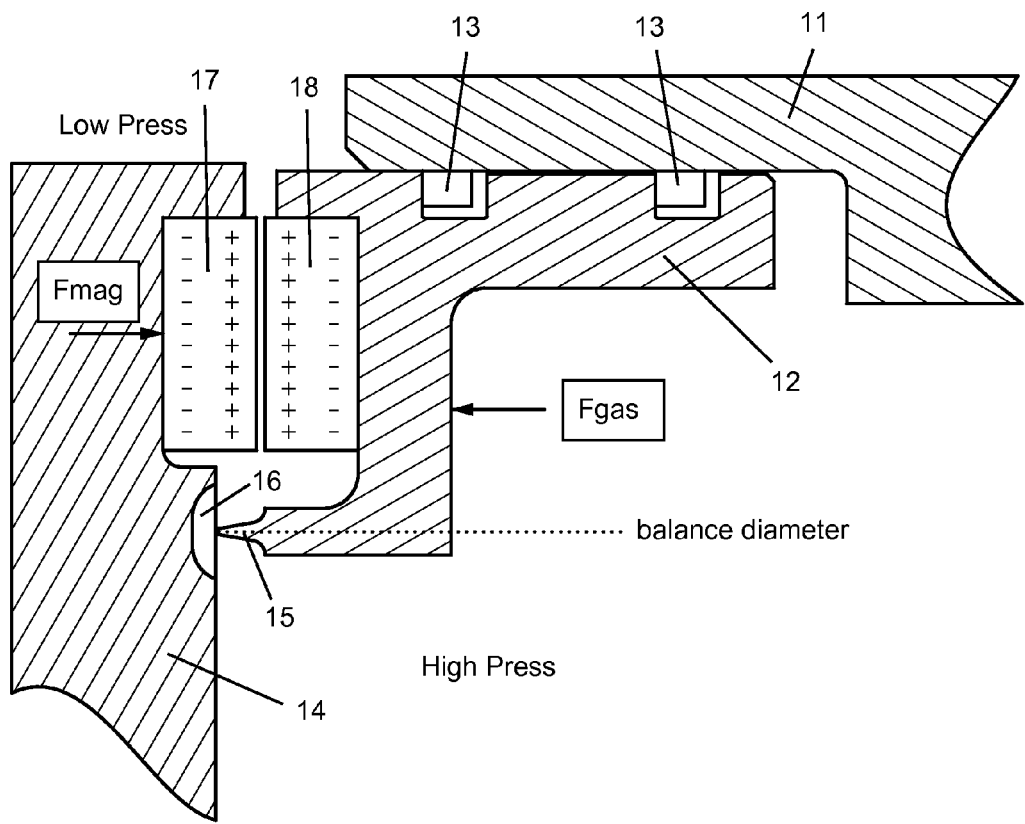
FIG. 1 shows a cross section view of a first embodiment of a high performance rotating to static balancing seal of the present invention.

FIG. 1 shows a cross section view of a first embodiment of the balancing seal between a static housing 11 and a rotor 14. The rotor 14 can be a rotor disk with turbine rotor blades while the static housing can be a stator vane inner endwall. A seal carrier 12 is capable of axial movement within the static housing 11 and includes two seals 13 that provide sealing. A stator magnet 18 is secured to the seal carrier 12. A seal tooth 15 extends from an axial arm of the seal carrier 12 and forms a seal with a rotor surface 16 such as an abradable surface. The seal tooth 15 is a full annular seal tooth. In the FIG. 1 embodiment, only one seal tooth is shown. However, multiple seal teeth can be used such as 2 to 5 full annular seal teeth to provide for multiple labyrinth sealing. A rotor magnet 17 is secured to the rotor 14. The two magnets 18 and 17 are each formed from an arrangement of magnets arranged in an annular array on the static housing and rotor and such that the two magnets repel each other away.

Figure 2:
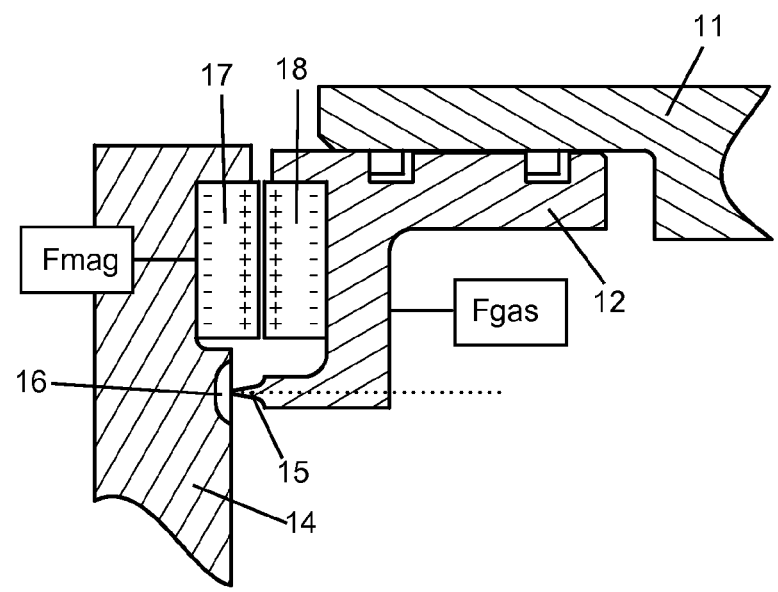
FIG. 2 shows the first embodiment of the balancing seal of FIG. 1 in a steady state position.

In FIG. 1, as the static housing 11 and the rotor 14 shift axially during operation of the turbine, a high pressure gas exposed to the seal carrier 12 will push the seal tooth 15 toward the rotor sealing surface 16. As the seal tooth 15 approaches the seal surface 16, the distance between the two magnets 17 and 18 will decrease and the repelling force will increase. A balance will form between the force of the high pressure gas on the seal carrier and the repelling force of the two magnets such that the seal tooth 15 will be positioned with a specific gap or spacing from the sealing surface 16. FIG. 2 shows the steady-state position when these two forces are balanced.

Figure 3:
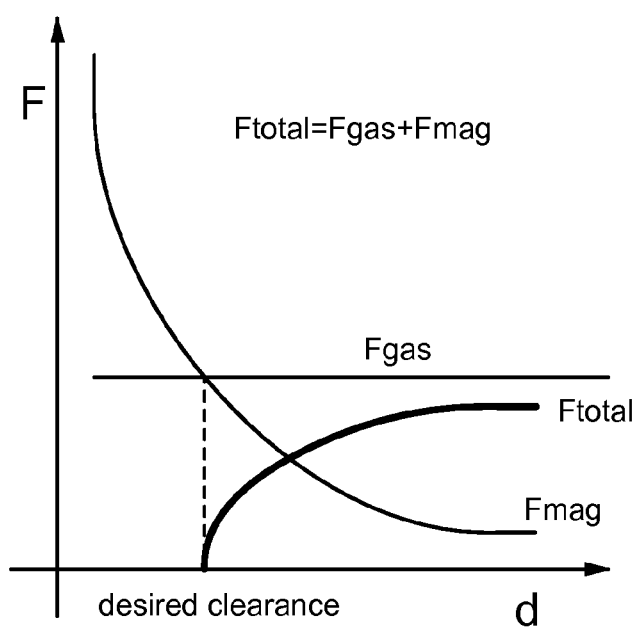
FIG. 3 shows a graph of Force versus distance curves for the magnetic force and the gas force acting on the seal in the steady state condition.

FIG. 3 shows a graph of the two forces that react on the seal in FIG. 2. The force from the high pressure gas acts to close the seal gap while the magnetic repelling force from the two magnets acts to open the seal gap. FIG. 3 shows a curve of the force of the high pressure gas which is a straight horizontal line and the magnetic repelling force which is a decreasing curve from left to right. Where the two graphs meet is the location of the balancing force and thus the desired clearance of the seal gap. The total force is seen in FIG. 3 and is zero at the desired clearance where the balancing force is equal and increases to the max at the greatest distance of the seal gap.

Figure 4:
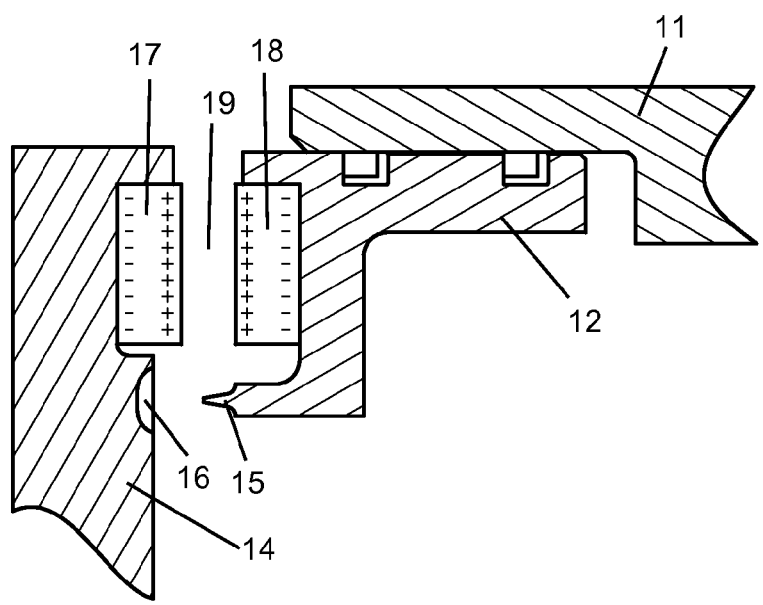
FIG. 4 shows the first embodiment of the balancing seal of FIG. 1 in a start-up or shut-down position.
Figure 5:
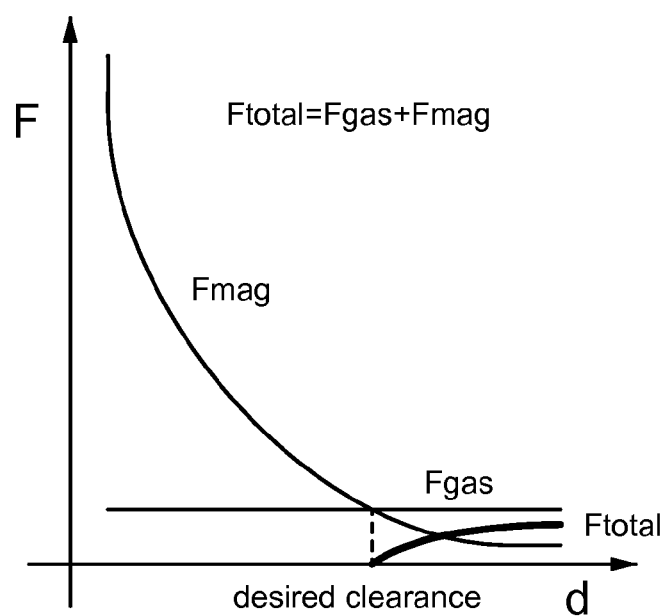
FIG. 5 shows a graph of Force versus distance curves for the magnetic force and the gas force acting on the seal in the start-up or shut-down position.

At a start-up condition, high pressure on the backside of the seal creates a pneumatic force (Fgas) that moves the seal towards the rotor 14. As the seal nears the rotor 14, an exponentially increasing magnetic force (Fmag) opposes the pneumatic force (Fgas) and prevents the seal from contacting the rotor 14. FIG. 4 shows the seal at a start-up or shut-down position where a gap 19 between the two magnets is the greatest. FIG. 5 shows a graph of the magnetic force and the pneumatic force with the desired clearance at the balancing force.

At a steady-state condition, steady-state clearance is reached when the pneumatic force (Fgas) balances the magnetic force (Fmag). A targeted design clearance is easily attained by adjusting the balance diameter effectively increasing or decreasing the pneumatic force (Fgas). The labyrinth tooth 15 provides a close clearance sealing surface and is allowed to rub into an abradable surface 16 to attain a very tight clearance. The close clearance is maintained by the axial flexibility of the seal and the balance forces, allowing the seal to track the rotor through axial movements. Radial deflections are accommodated with the axial labyrinth tooth that is insensitive to radial position.

As a shut-down condition, the pressure differential across the seal is reduced, diminishing the pneumatic force, allowing the magnetic force to move the seal away from the rotor 14.

Figure 6:
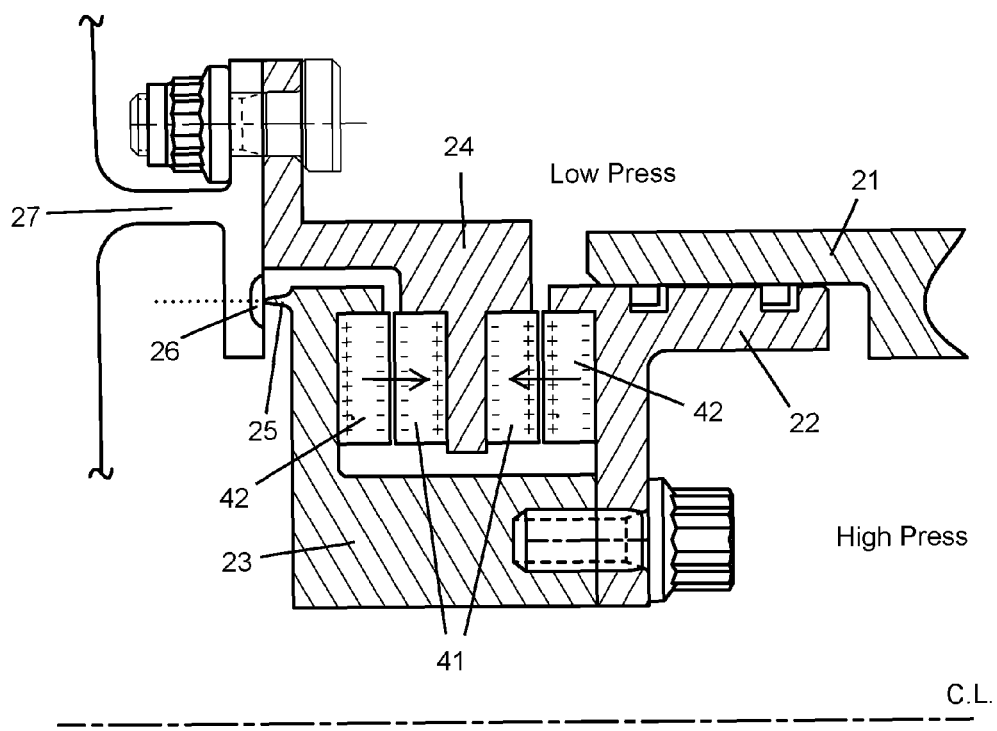
FIG. 6 shows a cross section view of a second embodiment of a high performance rotating to static balancing seal of the present invention.

FIG. 6 shows a second embodiment of the balancing seal of the present invention. The static housing 21 allows for a seal carrier 22 to move axially. A stator magnet holder 23 is secured to the seal carrier 22 and includes a seal tooth 25 that forms a seal with a sealing surface on a rotor 27. An abradable surface 26 can be used on the sealing surface for the labyrinth seal tooth 25. A low pressure region and a high pressure region exist around the seal but do not affect the operation of the seal. The seal tooth 15 is a full annular seal tooth. In the FIG. 6 embodiment, only one seal tooth is shown. However, multiple seal teeth can be used such as 2 to 5 full annular seal teeth to provide for multiple labyrinth sealing.

Figure 7:
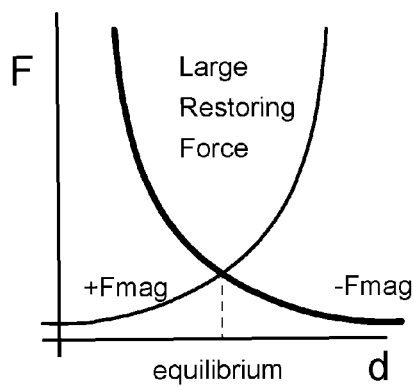
FIG. 7 shows a graph of Force versus distance curves for the positive and negative magnetic forces of the seal in FIG. 6 with a large restoring force.
Figure 8:
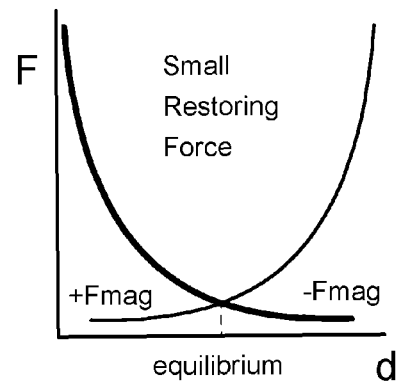
FIG. 8 shows a graph of Force versus distance curves for the positive and negative magnetic forces of the seal in FIG. 6 with a small restoring force.

In the FIG. 6 embodiment, two sets of magnets are used that act to push the seal tooth 25 toward and away from the seal surface 26. Two rotor magnets 41 are secured to a rotor magnetic holder 24 secured to the rotor 23 while two stator magnets 42 are secured to a stator magnet holder 23 secured to the seal carrier 22 of the stator 21. The two magnets on the right side of FIG. 6 will push the seal tooth 25 toward the sealing surface 26 while the two magnets on the left will push the seal tooth 25 away from the sealing surface 26. A balancing force is produced between the two sets of magnets at the desired position of the seal. FIG. 7 shows a graph for the positive magnetic force versus the negative magnetic force where the equilibrium position is where the two forces are equal. FIG. 7 shows the two curves for a large restoring force. FIG. 8 shows the two curves for a small restoring force. The two graphs are closer together when the restoring force is large.

Figure 9:
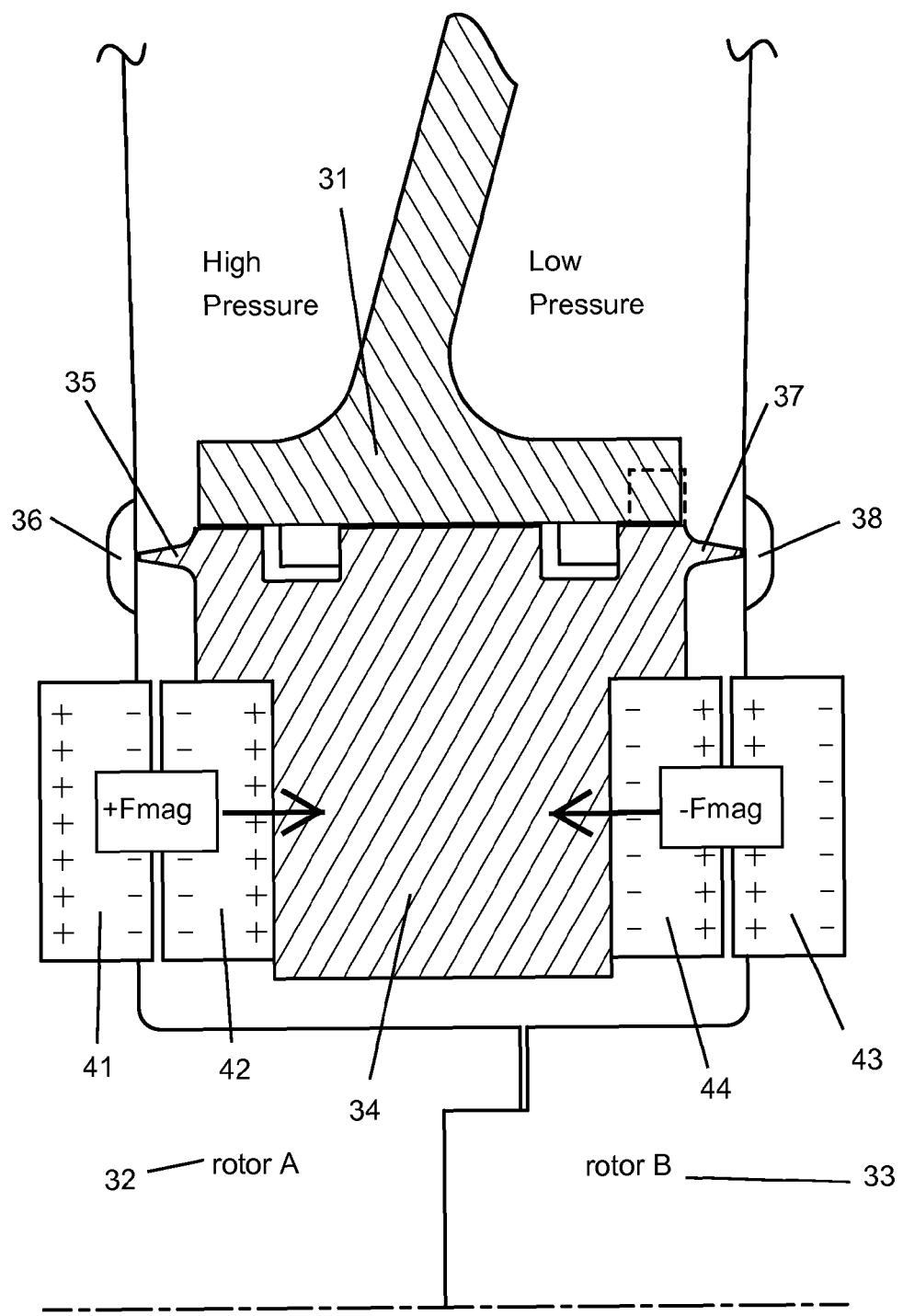
FIG. 9 shows a cross section view of a third embodiment of a high performance rotating to static balancing seal of the present invention.

FIG. 9 shows a third embodiment of the present invention in which a seal carrier 31 holds a seal 34 that includes a forward seal tooth 35 and an aft seal tooth 37. The seal 34 allows for axial movement on the seal carrier 31 and sealed with two seals. The forward seal tooth 35 forms a seal with a seal surface on a first rotor 32 with an abradable surface 36. The aft seal tooth 37 forms a seal with a seal surface on a second rotor 33 with an abradable surface 38. The seal teeth 25 and 37 are each a full annular seal tooth. In the FIG. 9 embodiment, only one seal tooth is shown on each side. However, multiple seal teeth can be used on each side such as 2 to 5 full annular seal teeth to provide for multiple labyrinth sealing.

A first set of magnets 41 and 42 are secured to the first rotor 32 and the forward side of the seal 34. A second set of magnets 43 and 44 are secured to the second rotor 33 and the aft side of the seal 34. Two rotor magnets 41 and 43 act against two stator magnets 42 and 44 to balance the seal carrier 31 within the two rotors 32 and 33. The two magnets on the left side 41 and 42 produce a net magnetic force towards the right side in FIG. 9 while the two magnets on the right side 43 and 44 produce a net magnetic force toward the left side in FIG. 9. A balancing force occurs between the two sets of magnets when the two seal teeth 35 and 37 are at the desired positioned with respect to the sealing surfaces 36 and 38. The FIG. 9 embodiment is similar to the FIG. 6 embodiment where the restoring forces keep the seal centered. The high pressure labyrinth tooth 35 maintains a very close clearance to the rotor 32 by the ability of the seal to axially track rotor movements. Thus as the two rotors 32 and 33 shift axially, the seal 34 with the two lab teeth 35 and 37 extending therefrom will move accordingly to maintain a desired seal clearance with the seal surfaces 36 and 38.

In the balancing seal with two sets of magnets (for example FIG. 9), the adjacent and opposing magnets must have the same polarities facing each other such that a repelling force will be produced. If the first set of magnets (41,42) is located far enough away from the second set of magnets (43,44) then both sets of magnets can have the inside faces with the same charges (i.e., both adjacent faces++ or both −−). When the two sets of magnets are close enough, then one set would have (++) charge while the other set would have (--) charge so that the inner magnets of the two sets would attract each other.

The magnetic force is a function of distance and is independent of speed and pressure. Thus it provides a constant force to ensure contact is avoided at any operating condition. The pneumatic force is a function of pressure and independent of distance. Thus it provides a closing force only as the engine builds pressure, reaching the desired clearance at the steady-state operating point.

For applications below 1,400 degrees F., samarium Cobalt (SmCo) magnets can be used that provide high remanence and coercivity making them very strong and resistant to demagnetization.

We claim the following:

1. An interstage seal in a turbine of a gas turbine engine between a rotor and a stator of the engine comprising:
   a seal carrier movable in an axial direction of the engine within the stator;
   an axial extending seal tooth fixed to the seal carrier;
   an annular seal formed between the stator and the seal carrier;
   a rotor with a rotor seal surface forming the interstage seal with the axial extending seal tooth;
   a stator magnet secured to the seal carrier;
   a rotor magnet secured to the rotor;
   the seal carrier having a surface exposed to a gas force that moves the seal tooth toward the rotor seal surface; and,
   the rotor magnet and the stator magnet produces a magnet force that push the seal tooth away from the rotor seal surface.

2. The interstage seal of claim 1, and further comprising:
   the gas force and the magnet force balances the interstage seal so the interstage seal maintains a close clearance to the rotor without the seal tooth contacting the rotor seal surface during engine operation.

3. The interstage seal of claim 1, and further comprising:
   the rotor seal surface includes an abradable material that contacts the seal tooth.

4. The interstage seal of claim 1, and further comprising:
   the seal tooth is a full annular seal tooth.

5. The interstage seal of claim 1, and further comprising:
   the seal tooth is a plurality of full annular seal teeth.

6. An interstage seal in a turbine of a gas turbine engine between a rotor and a stator of the engine comprising:
   a seal carrier axially moveable within the stator of the gas turbine engine;
   an axial extending seal tooth on the seal carrier;
   a rotor of the engine having a rotor seal surface forming the interstage seal with the axial extending seal tooth;
   the interstage seal separating a high pressure from a low pressure;
   a rotor magnet holder extending from the rotor;
   two rotor magnets are secured the rotor magnet holder;
   two stator magnets are secured to a stator magnet holder secured to the seal carrier;
   the two rotor and stator magnets closer to the seal tooth acting to push the seal tooth away from the rotor seal surface; and,
   the two rotor and stator magnets further from the seal tooth acting to pull the seal tooth away from the rotor seal surface.

7. The interstage seal of claim 4, and further comprising:
   the four magnets forming a magnet force that balances the interstage seal so the interstage seal maintains a close clearance to the rotor without the seal tooth contacting the rotor seal surface during engine operation.

8. The interstage seal of claim 4, and further comprising:
   the rotor seal surface includes an abradable material that contacts the seal tooth.

9. The interstage seal of claim 4, and further comprising:
   the seal tooth is a full annular seal tooth.

10. The interstage seal of claim 4, and further comprising:
    the seal tooth is a plurality of full annular seal teeth.

11. An interstage seal in a turbine of a gas turbine engine between a rotor and a stator of the engine comprising:
    a seal carrier extending from a stator of the gas turbine engine;
    an axial movable seal on the seal carrier;
    a first rotor with a first seal surface;
    a second rotor with a second seal surface;
    a forward axial extending seal tooth extending from the seal carrier and forming a first seal with the first seal surface;
    an aft axial extending seal tooth extending from the seal carrier and forming a second seal with the second seal surface;
    a first magnet secured on the first rotor;
    a second magnet secured on the seal carrier and opposed to the first magnet;
    a third magnet secured on the second rotor;
    a fourth magnet secured on the seal carrier and opposed to the third magnet;
    the first magnet and the second magnet producing a first magnetic force that pushes the forward seal tooth away from the forward seal surface on the first rotor; and,
    the third magnet and the fourth magnet producing a second magnetic force that pushes the aft seal tooth away from the aft seal surface on the second rotor.

12. The interstage seal of claim 7, and further comprising:
    the first and second magnetic forces balances the interstage seal so the forward and aft seal teeth maintains a close clearance to the first and second rotors without the seal tooth contacting the rotor seal surfaces during engine operation.

13. The interstage seal of claim 7, and further comprising:
    the forward and aft rotor seal surfaces each includes an abradable material that contacts the opposed seal tooth.

14. The interstage seal of claim 7, and further comprising:
    each of the forward and aft axial extending seal tooth is a full annular seal tooth.

15. The interstage seal of claim 7, and further comprising:
    each of the forward and aft axial extending seal tooth is a plurality of full annular seal teeth.

* * * * *